United States Patent [19]

Eizenhöfer

[11] Patent Number: 4,763,322
[45] Date of Patent: Aug. 9, 1988

[54] DIGITAL RADIO TRANSMISSION SYSTEM WITH VARIABLE DURATION OF THE TIME SLOTS IN THE TIME-DIVISION MULTIPLEX FRAME

[75] Inventor: Alfons Eizenhöfer, Altdorf, Fed. Rep. of Germany

[73] Assignee: U.S. Philips Corp., New York, N.Y.

[21] Appl. No.: 891,982

[22] Filed: Jul. 30, 1986

[30] Foreign Application Priority Data

Jul. 31, 1985 [DE] Fed. Rep. of Germany ....... 3527329

[51] Int. Cl.$^4$ .............................. H04J 3/12; H04J 3/22
[52] U.S. Cl. .......................................... 370/95; 370/84; 370/110.1; 379/63
[58] Field of Search ....................... 370/18, 79, 84, 95, 370/110.1; 455/33, 38, 34; 379/59, 63

[56] References Cited

U.S. PATENT DOCUMENTS

| | | | |
|---|---|---|---|
| 3,548,108 | 12/1970 | Yamato et al. | 370/95 |
| 3,649,764 | 3/1972 | Maillet | 370/95 |
| 3,947,674 | 3/1976 | Gutleber | 370/18 |
| 4,301,530 | 11/1981 | Gutleber | 370/18 |
| 4,322,845 | 3/1982 | Fennel, Jr. et al. | 370/95 |
| 4,357,700 | 11/1982 | Alvarez, III et al. | 370/79 |
| 4,455,651 | 6/1984 | Baran | 370/18 |
| 4,601,047 | 7/1986 | Horwitz et al. | 370/18 |
| 4,644,560 | 2/1987 | Torre et al. | 455/38 |
| 4,686,672 | 8/1987 | Namiki | 370/95 |

FOREIGN PATENT DOCUMENTS

731222 7/1975 Fed. Rep. of Germany ........ 370/18

OTHER PUBLICATIONS

Cooper, George R. and Nettleton, Ray W., "Cellular Mobile Technology: The Great Multiplier", IEEE Spectrum, Jun. 1983, pp. 30-37.

Primary Examiner—Douglas W. Olms
Assistant Examiner—Melvin Marcelo
Attorney, Agent, or Firm—Thomas A. Briody; Leroy Eason

[57] ABSTRACT

A cellular digital radio transmission system wherein messages are transmitted from a base station to a plurality of mobile stations assigned to it by time-division multiplexing of time slots in respective TDM time frames, each mobile station being assigned by the base station to a respective time slot constituting a channel for receiving and transmitting information. In order to fully utilize the channel capacity of the TDM time frames for users having different bandwidth requirements the base station divides each TDM time frame into time slots of different durations, whereby a mobile station can be assigned by the base station to a time slot of a duration corresponding to the bandwidth required by such mobile station.

3 Claims, 2 Drawing Sheets

DIGITAL RADIO TRANSMISSION SYSTEM WITH VARIABLE DURATION OF THE TIME SLOTS IN THE TIME-DIVISION MULTIPLEX FRAME

BACKGROUND OF THE INVENTION

1. Field of the Invention

The invention relates to a cellular digital radio transmission system employing time-division multiplex message channels between base stations and mobile stations in such system.

2. Description of the Prior Art

There are three known basic methods for sending digital messages over a transmission medium (e.g. transmission line, radio channel): these are code-division multiplexing, frequency-division multiplexing and time-division multiplexing.

In the code-division multiplexing method the different messages sent over a common transmission medium are imposed, for example, by baseband modulation, on a carrier and the resultant narrow-band signal (narrow in relation to the bandwidth of the channel) is spectrally spread over the channel bandwidth by multiplex modulation using a codeword that characterizes the receiver. Recognition of the signal at the receiver takes place not by time-division or frequency-division selection but on the basis of the spectral coding. The multiply stacked spectrally-coded messages in the code-division multiplex channel are selected at the receiver on the basis of their allocated codewords.

In the frequency-division multiplexing method the whole bandwidth available for message transmission is divided into narrow frequency bands, each of which corresponds to one message transmission channel. This narrow frequency band is at the disposal of the user for the duration of the message transmission.

In the time-division multiplexing method each user has available to him the whole bandwidth of a single transmission channel but only for short intervals of time. The characters or sequences of characters of various users are interleaved and are sent out with a correspondingly higher bit rate, the time channel, allocated to each user being periodically repeated after the duration of each frame period.

From West German Patent DE-OS No. 25 37 683 a radio transmission system with base stations and mobile stations is known, in which different channel access methods are used with asynchronous time-division multiplex, code-division multiplex and frequency-division multiplex.

Also known are combinations of the aforesaid methods and their application in a digital radio transmission system. For example, in "Nachrichtentechnik, Elektronik+Telematic 38 (1984), Vol. 7, pages 264 to 268" a digital radio transmission system is described in which the time-division multiplex method is used in combination with spectral coding, but in which the various users are not separated by means of the code-division multiplex method. In the time channels for speech and/or data message transmission (TCH communication channel) a bit sequence for establishing synchronism, a frame-synchronization word and the bit sequence of the message itself are transmitted one after the other. The time channels for message transmission (3×20 TCH) are arranged with organization channels (3 CCH) to form a time-division multiplex frame with a duration of 31.5 msec. If the message to be transmitted is a speech signal, adaptive delta modulation can be used for analog/digital conversion. A code is superimposed on the resultant message characters (bits) in the sender. It has proved advantageous to group the individual message bits into blocks of four bits each and to spread the resultant blocks with an orthogonal alphabet. The spreading factor used is a compromise designed to combine the advantages of band spreading with the requirement to use the frequencies economically.

As appears from the foregoing, it is common practice in radio transmission systems to transmit a multiplicity of communication channels by time-division multiplexing. The time-division multiplex frame is thereby divided into a fixed time slot raster and each mobile station is informed by the base station of the time slot in which the mobile station can receive or transmit information. Such a time-division multiplex method is advantageous when all users in the transmission system require the same channel bandwidth for the transmission of messages. However, if there are users in the system with different bandwidth requirements, the channel capacity available to users with low bandwidth requirements is not fully utilized. This is particularly disadvantageous in message transmission over radio channels, since the system bandwidth in a radio transmission system is in any case limited. Such users with different bandwidth requirements are found in data transmission for various services such as for example telefax, teletext, computer communications, etc. With the advance of technology, it is likely that in future there will be less bandwidth needed for speech transmission, especially in the case of analog/digital conversion. The later introduction of such a new generation of mobile radio stations with a lower bandwidth requirement is only conditionally possible with a time-division multiplex frame divided into a fixed time slot raster.

From West German Patent DE-PS No. 31 05 199 a method is known for transmitting data packages from several auxiliary stations to a main station using a common channel, in which the allocation of the time slot to the auxiliary stations or users is performed dynamically. Dynamic allocation means that a user, after access, is allotted as many time slots as he needs for transmitting the information, whereby the number of the time slots changes from access to access and from user to user. A method of this type is suited to the transmission of messages and of data packages that are not critical in terms of time, since the time between two successive accesses cannot be determined, that is to say no fixed data transmission rate can be guaranteed. Such a method cannot be used, however, for transmitting speech, because in the transmission of a speech signal it would be necessary during a conversation to have renewed access to the common transmission channel in accordance with the method indicated in DE-PS No. 31 05 199. Whether such attempted access is successful or not depends on the volume of traffic, so that this method cannot be used for the transmission of messages and of data that are critical in terms of time and are of different magnitude, though transmitted at a constant data rate. The aforesaid West German Patent DE-PS No. 3105199 corresponds to applicant's copending U.S. application Ser. No. 841,134, filed Mar. 18, 1986. That application discloses transmitter and receiver arrangements such as those described herein, but is directed to synchronization of the base station transmitter with the mobile station receivers.

The object of the invention is to enable optimum utilization of channel capacity in a cellular digital radio transmission system in which messages are grouped together by the time-division multiplex method for transmission over a common channel.

This object is achieved in accordance with the invention by providing time slots of different durations in each TDM time frame, thereby permitting the mobile stations to be assigned to time slots corresponding to their bandwidth requirements.

A digital radio transmission system in which the time slots in the time-division multiplex frame have different durations has the advantage that the channel capacity is optimally utilized by users with different bandwidth requirements. Since the useful channel capacity of the time-division multiplex frames can be divided in arbitrary steps depending on the requirements of the users, adaptation will be possible to future system extensions.

BRIEF DESCRIPTION OF THE DRAWINGS

A digital radio transmission system in accordance with the invention is described in more detail with reference to the accompanying figures, in which.

DESCRIPTION OF THE PREFERRED EMBODIMENTS

Figure 1:
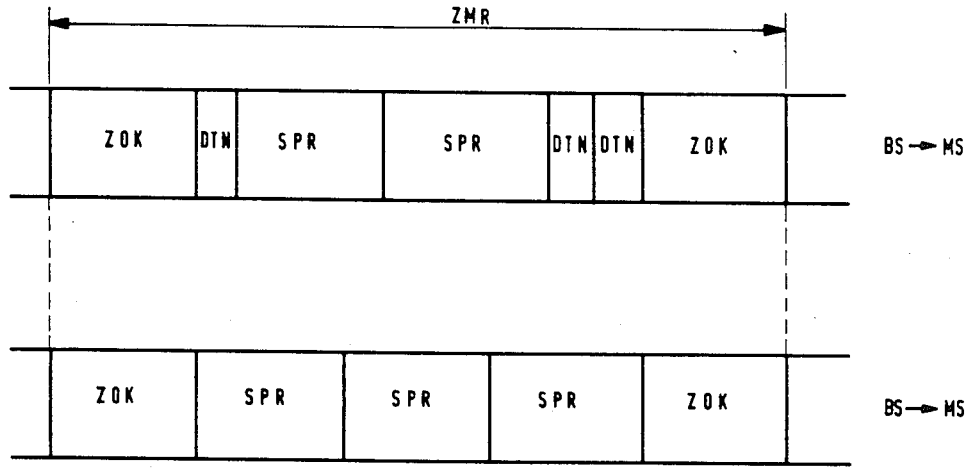
FIG. 1 shows the configuration of the time-division multiplex frame.

The time-division multiplex frame shown in FIG. 1 contains a central organization channel ZOK and can for example be provided with three data channels DTN and two speech channels SPR (first line) or with three speech channels SPR (second line). The central organization channel, over which the base station BS informs the mobile stations MS of their time slot allocations, may also be located in another channel at a different carrier frequency. The receiver in the mobile station MS requires only the frame synchronization and bit synchronization signals and the information identifying the first and last bit of the time slot allocated to it and which establish the duration, and therefore the bandwidth, of such time slot.

Figure 2:
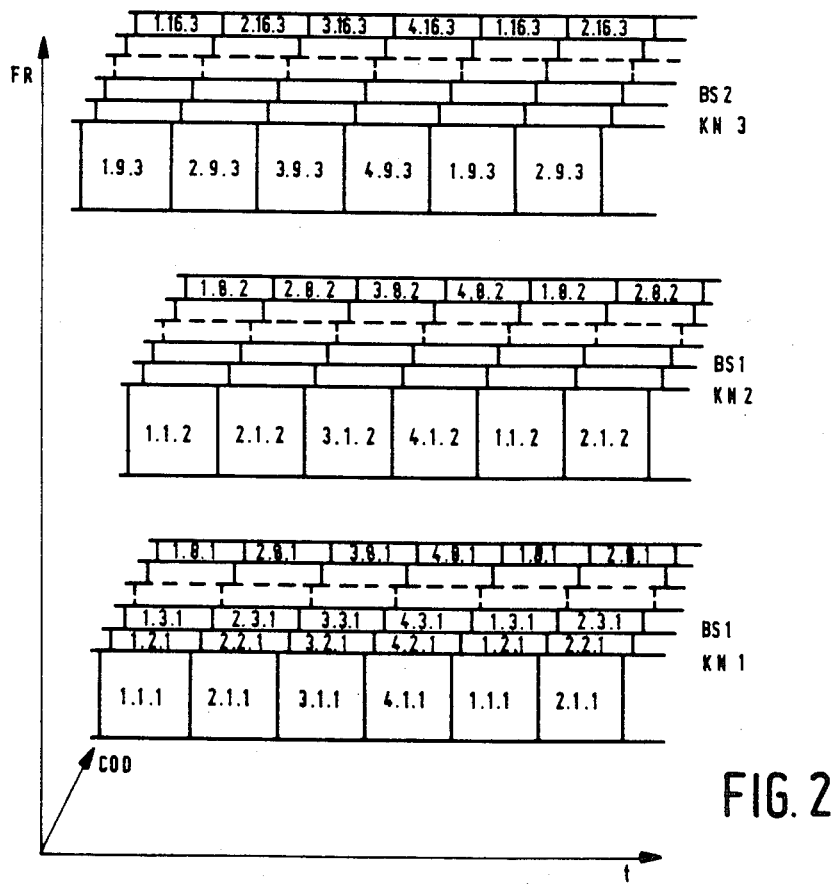
FIG. 2 shows the multiplexing within one cell of a cellular radio transmission system.
Figure 3:
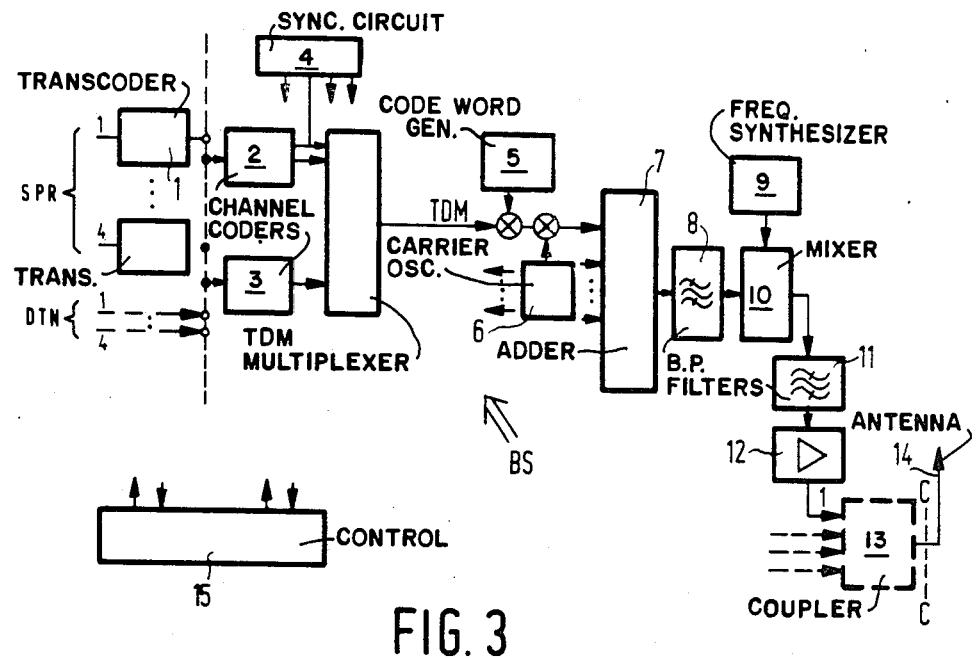
FIG. 3 shows a block diagram of the transmitting part of the base station.
Figure 4:
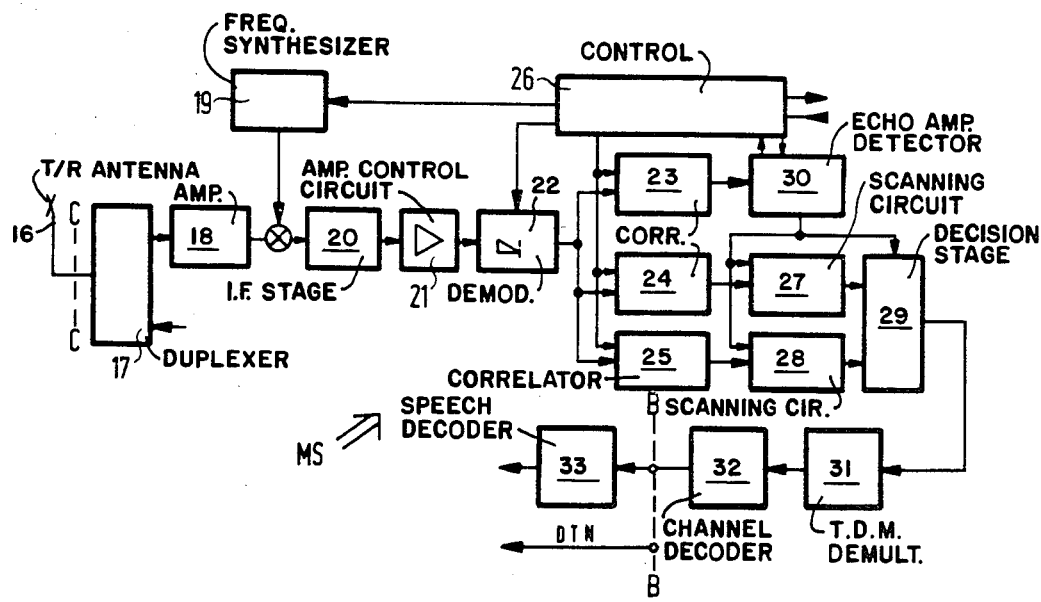
FIG. 4 shows a block diagram of the receiving part in the mobile station.

With reference to FIGS. 2, 3 and 4 a more detailed description will be given of an embodiment of a digital radio transmission system in which different combinations of multiplexing methods are used for grouping the communication channels. The messages for transmission are sent from the base station BS to the mobile stations MS in the communication channels using a combination of code-division, time-division and frequency-division multiplexing methods. Messages from the mobile stations MS to the base station BS can for example be sent by frequency-division over narrowband frequency channels which are separated from each other.

In a digital radio transmission system permanent base stations BS are arranged in a cellular configuration. To each base station BS a number of radio communication channels are allocated, over which messages are transmitted to mobile radio stations MS.

In the two transmission directions different combinations of multiplexing methods are used for grouping the communication channels. In the direction of transmission from the base station BS to the mobile stations MS the message to be transmitted (speech or data) is introduced into the communication channels using code-division multiplexing, time-division multiplexing and frequency-division multiplexing methods. For this purpose the base station BS is provided inter alia with a TDM multiplexer 3, a codeword generator 5 and a frequency synthesizer 9 (see FIG. 3). In the mobile station MS the communication channels of the received digital signal are separated using the code-division multiplexing, time-division multiplexing and frequency-division multiplexing methods. For this purpose the mobile station MS is provided inter alia with a frequency synthesizer 19, correlators 23, 24 and 25 and a TDM demultiplexer 31 (see FIG. 4). For the direction of transmission from the mobile stations MS to the base station BS the transmission takes place in separated narrowband frequency channels. In the following a description will be given of the multiplexing performed for the direction of transmission from the base station BS to the mobile station MS.

A base station BS has for example at least one set of channels consisting of 32 communication channels. The individual communication channels for the different mobile station MS in a set of channels are separated from each other by different bandspread codewords (CDMA) and/or different time slots (TDMA). FIG. 2 shows three of such sets of channels, and in the example shown the channel sets KN 1 and KN 2 belong to the same cell BS1 and channel set KN 3 belongs to a neighbouring cell BS2. The characterization of the individual communication channels (channel identification) is illustrated in FIG. 2 by a sequence of three-digit numbers. The first digit represents the number of the relevant time slot, the second digit the codeword used, and the third digit the number of the relevant FDM carrier frequency. The grouping of the communication channels in the direction of transmission from the base station BS to the mobile stations MS is effectuated by the consecutive methods of time-division, code-division and frequency-division multiplexing. This preferred sequence facilitates the implementation of the sending and receiving devices in the digital radio transmission system.

A channel set is built up for example by grouping together several time slots, each of which contains the information for one particular user, to form a time-division multiplex frame. In FIG. 2 the time-division multiplex frame comprises four time slots, e.g. communication channel 1.1.1 to 4.1.1. The time-division multiplex frame consists for example of 800 symbols and has a period duration of 20 msec. Of these, 20 synchronization symbols are distributed at regular intervals over the frame. The synchronization bits are not drawn in FIG. 1. For a common organization channel a number of symbols are provided, preferably at the beginning of the frame. As a rule, the time-division multiplex frame is provided with four speech channels each with a useful bit rate of 16 kbits and 3 kbits redundancy. The only fixed data for the formation of a time-division multiplex frame in the digital radio transmission system are the frame length and the situation of the organization channel in said frame.

Next the information in such a time-division multiplex frame is spread with suitably chosen codewords, which make it possible to transmit simultaneously several time-division multiplex frames at the same carrier frequency. The spreading of each of these time-division multiplex frames is done with a codeword which in this set of channels is allocated to this particular time-division multiplex frame only. This means on the one hand that within a channel set each time-division multiplex frame contains for the spreading operation a specific codeword that differs from the codewords of the other time division multiplex frames, and on the other hand that the information in the time slots of a given time-division multiplex frame is spread in accordance with the same codeword.

In the embodiment shown in FIG. 2 eight different codewords per channel set are used, that is to say a channel set contains eight different time-division multiplex frames each with four time slots, together totalling 32 communication channels per channel set.

By providing selected code symbols for the spreading operation, as for example pseudo-random, orthogonal or quasi-orthogonal codewords, it is possible at the same time to transmit messages in code-division multiplex. The eight individual spreading codes show a spread of 31, that is to say a length of 31 chips. All code-division multiplex channels are thereby transmitted by the base station BS with the same power and synchronously in time. By using four symbols in each code-division multiplex channel (the four symbols can for example be represented by two antipodal codewords) it is possible to combine two bits of the useful signal to form a single signal. This has the effect of halving the symbol rate as compared with the bit rate of the baseband. For the coding of the baseband signal and for synchronization there are six different symbols available, two of which are used exclusively for the synchronization. If eight individual spreading code levels are formed with four time-stacked channels, 32 communication channels of for example 16 kbit/s can be transmitted, which, after code-division spreading, are modulated on a common RF carrier. When four-phase modulation is used, the transmission of 32 communication channels takes e.g. a bandwidth of 1.25 MHz. The time-stacking and hence the number of communication channels per spreading code level depends on the bit rate needed for each message transmission channel.

Due to the combination of every two bits to form one of four possible symbols, the symbol duration of 25 $\mu$s remains sufficiencly long to avoid intersymbol interference caused by multipath reception, while on the other hand the outlay on the receiving hardware for the correlator system is low. The 16 spreading codes used within one base station BS to separate the code levels are for example orthogonal pairs, while the different synchronization symbols in several base stations BS with the same carrier should show minimum cross-correlation products for any given time shift.

The spreading can be performed for example with Gold codes. A change in the spreading code has little influence on the receiving equipment, since it contains programmable correlators which can be reset from one connection to another upon instructions from the base station BS. An organization channel can be provided for the transmission of such resetting information and for the separation of the individual time channels (communication channels) into time-division multiplex frames.

As already described, the time-division multiplex frames of a channel set are superimposed on one another in the transmitter of the base station BS, given the same amplification and transmitted on an RF carrier via an antenna. In the receiver of the mobile station MS the received digital signal is mixed in baseband. In the time slot allocated to this mobile station when building up the connection the information is then recovered by correlation with the codeword used for this communication channel, which codeword is communicated at the same time to the mobile station. In the receiver of the mobile station MS the separation of the communication channels of the received data signal thus takes place in reverse order, that is to say demultiplexing in terms of frequency, code and time, as in the grouping of the communication channels in the base station BS. Given a frame length of e.g. 20 ms for the timedivision multiplex frame, a symbol duration in the spreading codeword of 25 $\mu$s and a spread of 31, the chip duration lies at 0.806 ns and a chip rate at 1.24 Mcps. The chip duration is thus short enough to allow sufficient resolution and utilization of multipaths and to largely eliminate fading effects.

As remarked, at least one common organization channel is provided per set of channels, which is used by the mobile station MS for building up a connection and for the performance of certain special services. The mobile stations MS know the frequency status of the possible channel sets, the relevant time channel and the codewords for the organization channels provided within the digital radio transmission system. With this knowledge a mobile station MS can look for the organization channel suited to its purposes and can receive all necessary information for operation (e.g. frequency of the narrowband communication from the mobile station MS to the base station BS in the relevant organization channel) and for building up the connection (e.g. time channel and codeword for communication from the base station BS to the mobile station MS, and the frequency for the narrowband communication from the mobile station MS to the base station BS). The useful channel capacity of a time-division multiplex frame of 76 kbit/s (there are eight such codeword frames at an RF carrier frequency) can be divided stepwise in increments for example of 100 bit/s, between the two extreme values of a single user with 76 kbit/s and 760 users with 100 bit/s each.

If more than 32 communication channels are needed in a base station BS, then several channel sets can be superimposed on each other by frequency-division multiplexing. The different channel sets are transmitted with different RF carrier frequencies. In FIG. 2 the channel sets 1 and 2 are allocated to the base station BS1. For both channel sets allocated to the base station BS1 the same codewords can be used because they are transmitted at different carrier frequencies.

Separation of the communication channels of neighbouring base stations BS is performed either by frequency-division multiplexing (different RF carriers for the channel sets used in these base stations BS), using code-division multiplexing (different codeword sets for the channel sets used) or by combinations of both multiplexing methods. In the embodiment illustrated in FIG. 2 channel set 3 of base station BS2 differs from the two channel sets 1 and 2 of base station BS1 both in codeword set (second digit of channel identification) and in the RF carrier frequency used (third digit in channel identification). With sufficiently large spatial intervals (determined by interchannel interferences) from one cell to another, a channel set (RF carrier and/or codeword set) in the cell can be repeated. The possibility of using the same RF carrier frequency in the remote cell and/or to use different codeword sets results in additional flexibility and freedom in re-use planning and facilitates the introduction of small-cell structures.

For the direction of transmission from the mobile stations MS to the base station BS provision can be made, for example, for narrowband transmission with frequency channels in the 25 kHz raster. In the cells themselves the frequency distribution is not fixed but is left to the decision of the base station BS.

FIG. 3 shows a block diagram of the transmitter of the base station BS. The data/speech signals transmitted in baseband are composed as follows. The digitized speech in each channel is first recoded in a transcoder 1 from PCM to the transmission code required for the transmission, with a correspondingly smaller bit rate. At theintersection B-B a data source DTN can be connected. In a channel coder 2 connected to the data source or transcoder 1 special channel coding is added to protect significant bits against transmission errors in the transmission channel. This channel coding may differ, depending on the transmitting service. In a multiplexer 3 connected to channel coder 2 the signalling accompanying the data flow is added, together with the synchronization information from a sync circuit 4. The TDM signal (Time Division Multiplex signal) at the output of the TDM multiplexer 3 thus contains, in the embodiment illustrated in FIG. 3, four speech/data channels, one signalling channel accompanying the connection (for a TDM cluster of channels) and the synchronization bits required for synchronization in the mobile station MS. The synchronization bits may be added to the TDM data flow, as proposed in West German Patent DE P No. 35 11 430.4.

The TDM signal at the output of multiplexer 3 is multiplied by the codewords from the relevant code generators 5, whereby two bits are combined to form one signal and are spread with the desired code. The spread signalis modulated by a method adapted to the properties of the transmission channels, whereby for example the spread signal is keyed so as to shift the phase of a carrier signal from an oscillator 6, resulting in a signal carrying the information and the codeword, and which is modulated with a lower intermediate frequency (Binary Phase Shift Keying, BPSK). The modulated CDM (Code Division Multiplex) signal is fed to an adder 7 whose output is connected to a bandpass filter 8. Eight of these modulated CDM signals, after addition and bandpass filtering, form a multistage-amplitude composite signal which is finally converted to the end frequency.

For this purpose a mixer oscillator is provided as a frequency synthesizer 9, which can be switched in corresponding stages within the frequency range of the digital radio transmission system. The synthesizer 9 is designed only for the few possible frequencies of the FDM stage (Frequency Division Multiplex stage). Mixing of the CDM signals with the frequency delivered by the corresponding synthesizer 9 is performed in a circuit 10 which is connected to a band-pass filter 11. The output of the bandpass filter 11 is connected to a power amplifier 12, from which the filtered and amplified transmission signal goes via a coupling device 13 to the antenna 14. In smaller base stations BS with up to 32 message transmission channels the antenna coupling device 13 is not required.

A control circuit 15 in the base station BS takes care of the setting of channel and code generators, the correct choice of channel coding and the addition of announcements in the organization data flow. The transmission channel selected for this purpose may be a TDM channel in a CDM plane (see P No. 35 11 430.4).

FIG. 4 shows a block diagram of the receiving part of a mobile station MS. The signal received from a common transmitting/receiving antenna 16 passes through the reception filter of a duplexer 17 to the input stage 18 of the receiver. The requirements to be met by the reception filter of the duplexer 17 are not very stringent, so that mobile stations MS with simple service functions, e.g. simple data signalling, can be relatively inexpensive. In the input stage 18 the signalis amplified and then mixed with a frequency from the frequency synthesizer 19 to form an intermediate-frequency signal.

The intermediate frequency signal is fed to an IF stage 20, where it is further amplified and filtered. As compared with the case of the synthesizer 19 in the base station BS, a simpler type can be used for the synthesizer 9 in the mobile station MS, which can be produced more cheaply. The IF stage 20 contains filters which serve to delimit neighbouring channel selection against neighbouring broadband channels and to suppress mixing products in it. The actual noise filtering takes place in correlators 23, 24 and 25. Connected to the IF stage 20 is an amplitude control circuit 21 which raises the output level of the IF stage 20 to a level sufficient to drive the subsequent stages and prevents possible overloading of these circuits. The amplitude control circuit 21 uses estimates to equalize variations in field strength and level fluctuations, thus permitting linear processing of the signals in the subsequent circuits of the mobile station MS. The control time-constant of the amplitude control circuit 21 depends essentially on these estimates.

The power-controlled IF signal at the output of the amplitude control circuit 21 is converted into baseband in a demodulator 22 connected to 21. Using BPSK modulation for example, this can be done in accordance with the Costas loop principle, which applies to both frequency and phase. From the polarity of the received synchronization words it is possible (see P No. 35 11 430.4) to recognize and equalize ambiguities of integral multiples of 180°.

Connected to the demodulator 22 are three correlators 23, 24 and 25 which, by means of a control device 26, can be set for the applicable codes 1 and 2 and for a sync code applicable to the whole set of channels in the transmissionzone. The control device 26 also serves for evaluating the organization data signals received, producing a read-out of the data for the services required by users and the data for the transmission channels provided for particular types of equipment, for the selection of switchable transmission channels freely available to the mobile station in the organization data flow, and an access signal for transmission to the base station BS on this selected transmission channel.

The output signal of the correlators 23, 24 and 25 is used on the one hand for deriving the symbol, frame and bit synchronization, and on the other hand for evaluating the instantaneous multipath profile. Since a standard synchronization code of appropriate level is sent out at the same instant in the combined group of channels (see P No. 35 11 430.4) synchronization identification and evaluation of the multipath profile are ensured.

The outputs of the correlators 23, 24 and 25 are connected to scanning circuits 27, 28 which sample the output signals of the correlators 23 to 25 and feed the results to a decision stage 29. The results of the scans performed in the decision stage 29, synchronously with the echoes of the multipath evaluations, are weighted in proportion to the amplitude of the echoes (determined by a device 30). The decision stage 29 has the task of estimating the transmitted code and the polarity of the code. The estimated value makes it possible to select the symbol that has most probably been transmitted. After the symbol-bit conversion in the decision stage 29, the output signal is fed to a TDM demultiplexer 31 connected to the decision stage 29. The demultiplexer 31 is connected to a channel decoder 32 at the output of which the transmitted data flow is again available. In digital speech transmission the digital speech signal is decoded in a speech decoder 33, in a D/A converter and fed to a connected loudspeaker.

If a mobile station MS has been equipped for example for a data service, the data appearing at the output of the channel decoder 32 can immeidiately be displayed or printed out.

What is claimed is:

1. In a cellular digital radio transmission system comprising a plurality of base stations and a plurality of mobile stations assigned to each base station, communication channels between a base station and its mobile stations being established by time-division multiplexing of time slots in successive time frames, each time slot being allocated to a particular mobile station; the improvement characterized in that the base station comprises: means for establishing a plurality of time slots of different durations in each TDM time frame, the duration of the time slot allocated to a mobile station remaining the same in all successive TDM time frames; and means for allocating the mobile stations assigned to such base station to respective ones of such time slots having durations corresponding to the bandwidth requirements of such mobile stations.

2. A cellular digital radio transmission system as claimed in claim 1, further characterized in that each TDM time frame transmitted by each base station includes an organization channel which specifies a first bit and a last bit of each time slot in such time frame, whereby a mobile station is informed of its allocated time slot.

3. A cellular digital radio transmission system as claimed in claim 1, further characterized in that said means for providing time slots of different durations in each TDM time frame divides each TDM time frame stepwise into a plurality of time slots ranging from minimum duration to a maximum duration, thereby providing a stepwise variation in the time slots allocated to the different mobile stations.

* * * * *